(12) United States Patent
Douros et al.

(10) Patent No.: US 9,116,759 B2
(45) Date of Patent: Aug. 25, 2015

(54) RESTARTING DATA PROCESSING SYSTEMS

(75) Inventors: Bryan Phil Douros, Framingham, MA (US); Joseph Skeffington Wholey, III, Belmont, MA (US)

(73) Assignee: Ab Initio Technology LLC, Lexington, MA (US)

(*) Notice: Subject to any disclaimer, the term of this patent is extended or adjusted under 35 U.S.C. 154(b) by 534 days.

(21) Appl. No.: 13/031,078

(22) Filed: Feb. 18, 2011

(65) Prior Publication Data

US 2012/0216202 A1    Aug. 23, 2012

(51) Int. Cl.
     *G06F 9/46*      (2006.01)
     *G06F 11/07*      (2006.01)
     *G06F 9/54*      (2006.01)
     *G06F 11/14*      (2006.01)

(52) U.S. Cl.
     CPC ............ *G06F 9/542* (2013.01); *G06F 11/1438* (2013.01); *G06F 11/1482* (2013.01)

(58) Field of Classification Search
     CPC .. G06F 9/542; G06F 11/1438; G06F 11/1482
     USPC .......................................... 718/102; 719/313
     See application file for complete search history.

(56) References Cited

U.S. PATENT DOCUMENTS

| | | | |
|---|---|---|---|
| 5,712,971 A | 1/1998 | Stanfill et al. | |
| 5,819,021 A | 10/1998 | Stanfill et al. | |
| 5,966,072 A | 10/1999 | Stanfill et al. | |
| 6,289,474 B1* | 9/2001 | Beckerle ......................... | 714/37 |
| 6,584,581 B1* | 6/2003 | Bay et al. ........................ | 714/16 |
| 7,164,422 B1 | 1/2007 | Wholey, III et al. | |
| 7,167,850 B2 | 1/2007 | Stanfill | |
| 2002/0188653 A1* | 12/2002 | Sun ............... | 709/201 |
| 2003/0149691 A1* | 8/2003 | Potts et al. ....................... | 707/3 |
| 2005/0114369 A1 | 5/2005 | Gould et al. | |
| 2005/0257090 A1* | 11/2005 | Santos et al. .................... | 714/35 |
| 2006/0095466 A1 | 5/2006 | Stevens et al. | |
| 2007/0271381 A1 | 11/2007 | Wholey et al. | |
| 2008/0049022 A1 | 2/2008 | Sherb et al. | |
| 2008/0126842 A1 | 5/2008 | Jacobson et al. | |
| 2008/0201608 A1 | 8/2008 | Forhan et al. | |
| 2008/0256014 A1 | 10/2008 | Gould et al. | |
| 2008/0294698 A1 | 11/2008 | Fujimoto et al. | |
| 2009/0037585 A1 | 2/2009 | Miloushev et al. | |
| 2009/0049443 A1 | 2/2009 | Powers et al. | |
| 2009/0083313 A1 | 3/2009 | Stanfill et al. | |
| 2009/0089471 A1 | 4/2009 | Barros | |
| 2009/0282406 A1 | 11/2009 | Malki et al. | |

(Continued)

OTHER PUBLICATIONS

Andrews "Paradigms for process interaction in distributed programs" ACM Computing Surveys (CSUR) Surveys Homepage archive vol. 23 Issue 1, Mar. 1991 pp. 49-90.*

(Continued)

*Primary Examiner* — Emerson Puente
*Assistant Examiner* — Willy W Huaracha
(74) *Attorney, Agent, or Firm* — Fish & Richardson P.C.

(57) ABSTRACT

Techniques are disclosed that include a computer-implemented method including transmitting a message in response to a predetermined event through a process stage including at least first and second processes being executed as one or more tasks, the message instructing the abortion of the executing of the one or more tasks, and initiating abortion of execution of the one or more tasks by the one or more of the processes on receiving the messages.

47 Claims, 6 Drawing Sheets

(56) References Cited

U.S. PATENT DOCUMENTS

| | | |
|---|---|---|
| 2009/0313311 A1 | 12/2009 | Hoffmann et al. |
| 2009/0327807 A1 | 12/2009 | Varadarajan et al. |
| 2010/0005275 A1 | 1/2010 | Kamigata |
| 2010/0011435 A1 | 1/2010 | Wee et al. |
| 2010/0050176 A1* | 2/2010 | Vanderpool ............ 718/100 |
| 2010/0094948 A1 | 4/2010 | Ganesh et al. |
| 2010/0125758 A1 | 5/2010 | Yang et al. |
| 2010/0131796 A1 | 5/2010 | Engelbrecht et al. |
| 2011/0119525 A1 | 5/2011 | Muralimanohar et al. |
| 2011/0119526 A1 | 5/2011 | Blumrich et al. |
| 2011/0209151 A1 | 8/2011 | Chung et al. |
| 2011/0239010 A1 | 9/2011 | Jain et al. |
| 2011/0276821 A1 | 11/2011 | Gudlavenkatasiva et al. |
| 2011/0282982 A1 | 11/2011 | Jain |
| 2012/0042077 A1* | 2/2012 | Ceccarelli et al. ............ 709/226 |
| 2012/0066555 A1 | 3/2012 | Ganesh et al. |
| 2012/0089571 A1 | 4/2012 | Mercer et al. |
| 2012/0158447 A1 | 6/2012 | Jain |
| 2012/0197959 A1 | 8/2012 | Oliver et al. |
| 2012/0216202 A1 | 8/2012 | Douros et al. |

OTHER PUBLICATIONS

Baldoni, R., et al., "Characterization of Consistent Global Checkpoints in Large-Scale Distributed Systems." Proceedings of the Fifth IEEE Computer Society Workshop on Future Trends of Distributed Computing Systems, Jan. 1, 1995, pp. 314-323.

Chen, Yuqun, et al., "CLIP: A Checkpointing Tool for Message-Passing Parallel Programs." Proceedings of the $2^{nd}$ ACM Workshop on Role-Based Access Control. RBAC '97. Nov. 15, 1997, 11 pages.

Higaki, Hiroaki, et al., "Checkpoint and Rollback in Asynchronous Distributed Systems." INFOCOM '97. Sixteenth Annual Joint Conference of the IEEE Computer and Communications Societies, Apr. 1997, pp. 998-1005.

International Search Report and Written Opinion, PCT/US/2012/025388, mailed May 22, 2012, 14 pgs.

International Search Report and Written Opinion, PCT/US/2012/025424, mailed May 22, 2012, 14 pgs.

Samaras, George, et al., "Two-Phase Commit Optimizations in a Commercial Distributed Environment." Distributed and Parallel Databases, vol. 3, 1995, pp. 325-360.

Sisto, Riccardo, et al., "A Protocol for Multirendezvous of LOTOS Processes." IEEE Transactions on Computers, vol. 40, No. 4, 1991, pp. 437-447.

Tartanoglu, Ferda, et al., "Using the B Method for the Formalization of Coordinated Atomic Actions." University of Newcastle upon Tyne, Oct. 2004, 18 pgs.

Restarting Processes, 22 pages.

Transaction History, U.S. Appl. No. 13/030,998, Jul. 10, 2013, 1 page.

* cited by examiner

RESTARTING DATA PROCESSING SYSTEMS

BACKGROUND

This description relates to restarting data processing systems.

Computational speeds provided by single processor computers have advanced tremendously over the past decades. However, many applications executed by such processors may need computational capacities that exceed even the fastest single processor computer. For example, in a transactional system, e.g., an airline reservation system, multiple users may concurrently access computer resources. These users typically expect low response times. A single process computer may not be able to keep up with such demand. A variety of architectures such as parallel processing systems have been developed to handle such applications to improve performance. In general, parallel processing systems use multiple processors that may be located at a single site or remotely distributed. Due to their processing capabilities, such parallel processing systems have become relied upon for applications that process large volumes of data, which in some cases can include essentially continuous and near real-time processing. Such processing capabilities are expected to be robust and resistant to system failures, i.e., fault tolerant. These capabilities are useful for all kinds and sizes of computer networks ranging from large-scale Internet-based data processing to private networks and communication systems (e.g., internal corporate "intranets", etc.).

SUMMARY

In one aspect, in general, a computer-implemented method includes transmitting a message in response to a predetermined event through a process stage including at least first and second processes being executed as one or more tasks, the message instructing the abortion of the executing of the one or more tasks, and initiating abortion of executing of the one or more tasks by the one or more of the processes on receiving the messages.

Aspects can include one or more of the following.

The computer-implemented method can include storing information related to initial states of each of the first and second processes upon being initialized. Execution of a process can include executing at least one execution phase of the process and storing information representative of an end state of the execution phase upon completion of the corresponding execution phase. The computer-implemented method can include resuming execution of one or more of the first and second processes from one of the saved end states without needing to shut down the processes.

The predetermined event can represent a loss of connection to an external device. The predetermined event can represent an error with an external device. Process execution can be resumed when the connection to the external device has been restored. Process execution can be resumed when the error with the external device has been cleared. Process execution can be resumed from an end state that is stored prior to an execution phase in which the predetermined event occurred. Execution of one or more of the first and second processes can be resumed from the initial states if the predetermined event occurs substantially immediately after startup of the processes.

Process execution can include performing one or more processing actions on a received stream of data to produce output data. The computer-implemented method can include transmitting a checkpoint message through the first and second processes of the process stage, the checkpoint message including instructions for storing current information about the processes, and aborting operation of upon receiving the checkpoint message at the process and initiating storage of information related to a current execution state of the process to a storage area. The computer-implemented method can include overwriting a previously stored initial or end state with the new initial or end state.

Each of the first and second processes may be in communication with one or more data queues for receiving and queuing data for the processes. The computer-implemented method can include generating the checkpoint message in response to a network-related event. The network-related event can represent a network shutdown. The computer-implemented method can include periodically generating the checkpoint message. The computer-implemented method can include producing the checkpoint message in response to one or more data values within or derived from incoming data records to be processed by the processes. The computer-implemented method can include resuming execution of one or more of the first and second processes from one of the saved end states based in part on information contained in a resume processing message. The computer-implemented method can include receiving the one or more messages during a first execution phase of the first process substantially immediately after initialization of the first process, and resuming execution of the first process from a saved initial state without needing to shut down and restart the first process.

In another aspect, in general, a computer-readable storage medium storing a computer program includes instructions for causing a computing system to: transmit a message in response to a predetermined event through a process stage including at least first and second processes executing one or more tasks, the message instructing the abortion of the one or more tasks being executed, and initiate abortion of execution of the one or more tasks by the one or more of the processes on receiving the messages.

In another aspect, in general, a computing system includes device or port configured to transmit a message in response to a predetermined event through a process stage including at least first and second processes executing one or more tasks, the message instructing the abortion of the one or more tasks being executed; and at least one processor configured to initiate abortion of execution of the one or more tasks by the one or more of the processes on receiving the messages.

In another aspect, in general, a computing system includes means for transmit a message in response to a predetermined event through a process stage including at least first and second processes executing one or more tasks, the message instructing the abortion of the one or more tasks being executed, and means for initiating abortion of execution of the one or more tasks by the one or more of the processes on receiving the messages.

Aspects can include one or more of the following advantages.

Processes in multi-process processing systems can be executed in distinct execution phases. In the event of a system failure, terminating and restarting a processing system from the most recently complete checkpoint can consume an undue amount of processing time and resources. After a processing system has terminated its activity in response to the exception condition, the processing system may need to be manually reinitialized by an information technology specialist experienced with such systems. This can result in significant system downtime. In some examples, a separate process may also be needed to detect the system failure and inform a specialist. As such, to improve efficiency and reduce processing resource consumption, processes within the processing system may be executed from their last recorded checkpoints instead of restarting the entire system upon a failed connection to a process being restored. In one implementation, rather than terminating and restarting the entire system, the individual processes in the system may be informed to suspend processing until the failed connection is restored.

Other features and advantages of the invention will become apparent from the following description, and from the claims.

DESCRIPTION

Figure 1:
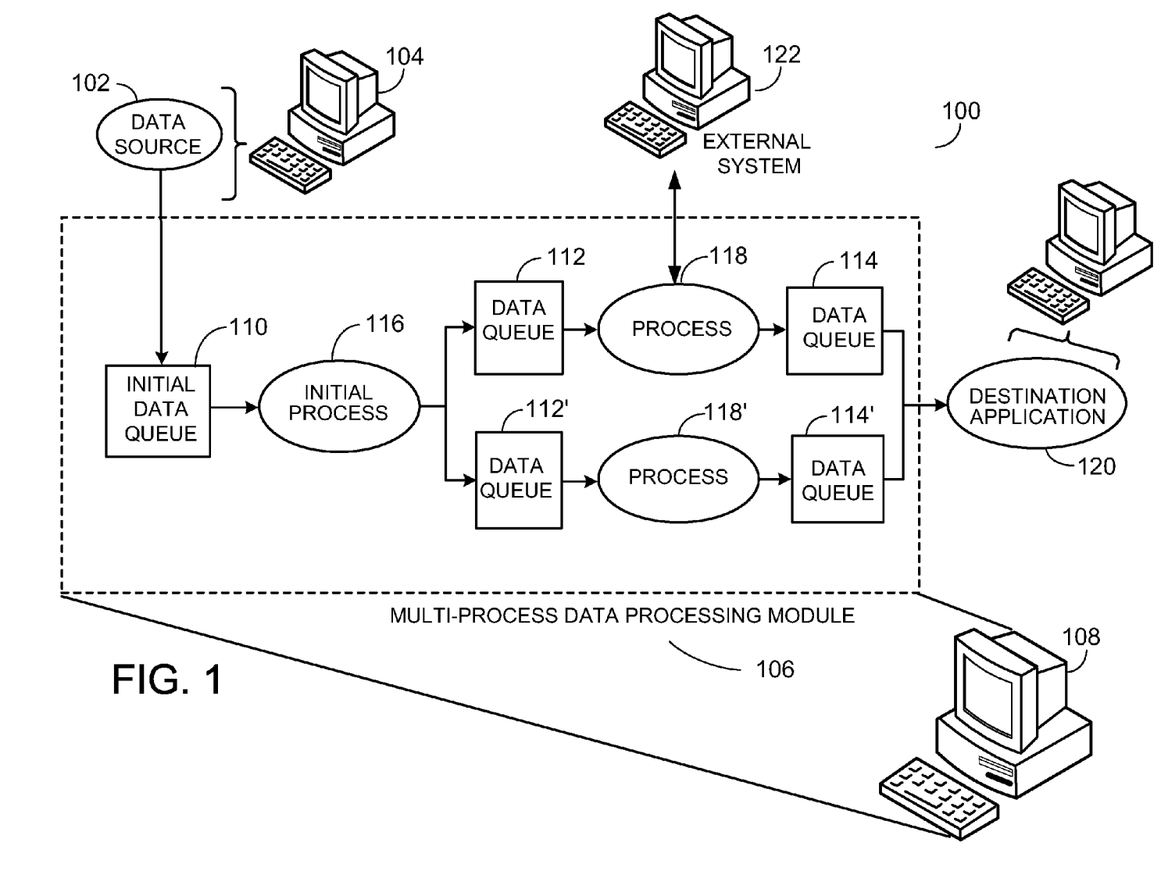
FIG. 1 is a block diagram of a multi-process data processing system.

Referring to FIG. 1, a data processing system 100 provides multiple processes arranged in a streamlined manner for processing data. Within the exemplary system 100, data is received from a data source 102 (e.g., an application being executed on a server 104 that functions as a Web server) and communicated to a multi-process data processing module 106 being executed on a computer system 108 or executed in a distributed manner (e.g., with two or more networked computer terminals). The data processing module 106 monitors, controls, and performs the data processing aspects of the system 100. To provide such processing, the data processing module 106 includes one or more queues 110, 112, 114 capable of storing data to be processed by one or more processes 116, 118. In this instance, as shown, data received from the data source 102 is stored in an initial data queue 110 and periodically provided to the initial process 116. The process 116 processes the data (e.g., transforms, filters, confirms content, etc.) and provides the processed data to one or more downstream data queues 112, 112'. Subsequent processes 118, 118' may be provided data from the queues 112, 112' and perform other (or similar) processing before in turn delivering results to other downstream data queues 114, 114'. The illustrated queue and process layout of data processing module 106 is one of many possible processing schemes that may be utilized. For example, the data processing module 106 may include additional processes (e.g., for parallel or serial execution) that may be located upstream, downstream or independent of the shown processes. In some examples, data from the last set of queues (e.g., queues 114 and 114') may be output to a destination application 120 (or multiple applications), such as a relational database management system (RDBMS).

The processes included in the data processing module 106 may be in communication with external devices and/or other processing systems (e.g., a computer system 122). For example, the processes may be in communication with a Java Message Service (JMS) queue that provides messages to the processes from other systems. In some cases, the processes in the data processing module 106 may be in communication with one or more databases (e.g., located in the external system 122). For example, the module 106 may perform updates to customers' financial accounts in a bank database based on information received from corresponding customer sessions at one or more automated teller machines (ATM).

Figure 2:
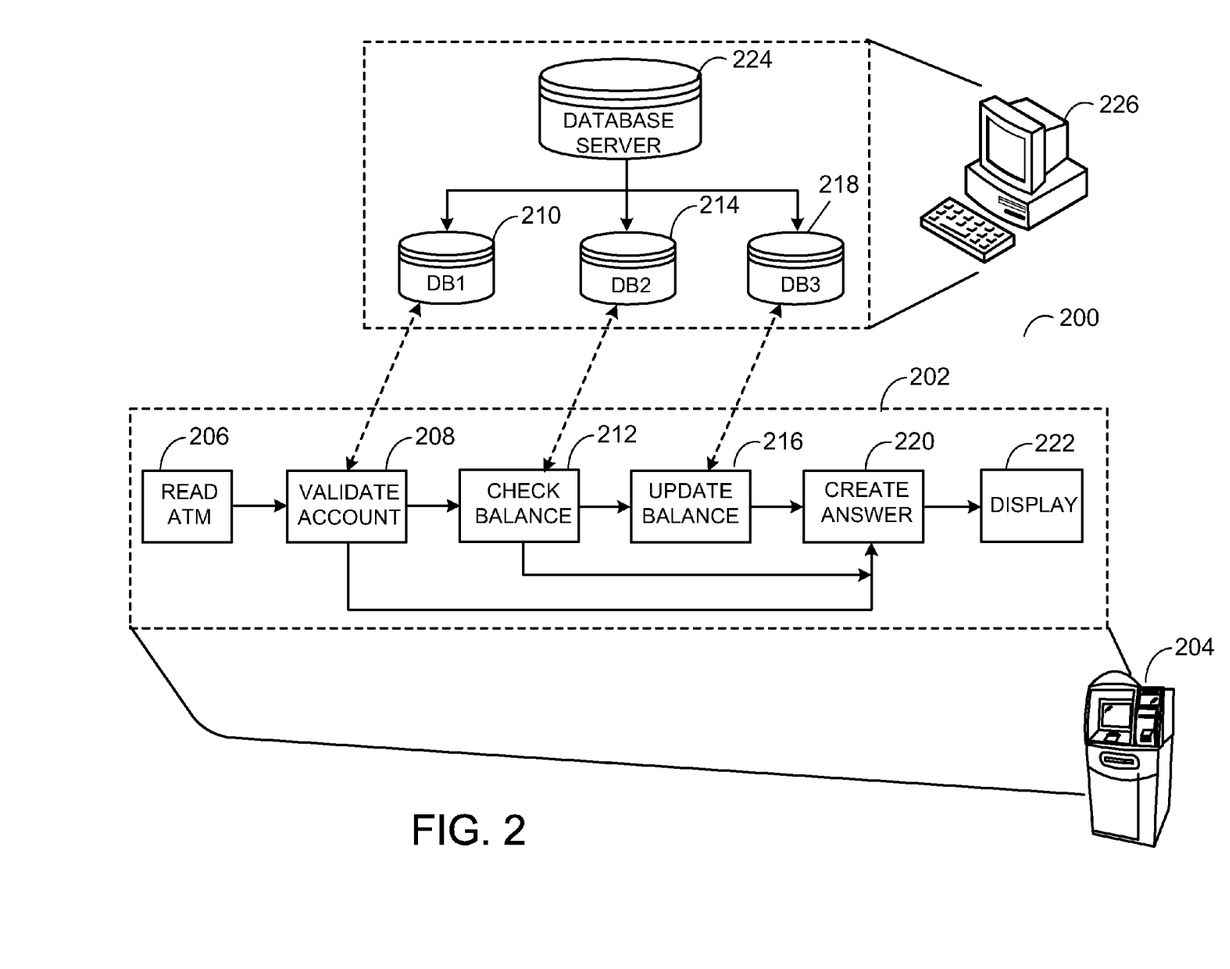
FIGS. 2 and 3 illustrate exemplary multi-process data processing systems.

By way of example, FIG. 2 illustrates a processing system 200 having a remotely executed processing module 202 (executed by an ATM 204) being used to provide data for processing at a central location. In the illustrated example, an initial process, e.g., a read ATM process 206 is capable of receiving customer account data (e.g., associated with a transaction) from an ATM and passing the data to a validate account process 208 for authenticating the account details. In this instance, the validate account process 208 can verify a personal identification number (PIN) entered by the customer against a PIN database 210. Once the customer's identity has been authenticated, further data records may be communicated downstream to a check balance process 212, which may communicate with a second, different database 214, e.g., for checking the balance of the identified customer account. After further transactions are completed, additional data may be sent downstream to an update balance process 216 which may communicate with a third database 218, e.g., for updating the balance information associated with the customer account. A create answer process 220 may prepare an output summary of the transactions, which may be provided to an output display process 222 (e.g., for displaying on the ATM 204 to the customer). For system-level monitoring (e.g., system quality assurance) or other applications, the databases 210, 214, and 218 may be in communication with a master data server 224. In some implementations, the databases may be executed, for example, by a standalone computer system 226.

Processes in such multi-process processing systems may be executed in distinct execution phases. Execution of processes can include execution of one or more tasks within the processes in distinct execution phases. By segmenting execution into such phases, the distinct execution phases may be terminated, e.g., by multiple logical endpoints or breakpoints in data processing. Each execution phase may have one or more processing actions to achieve the objectives of that execution phase. As an example, the validate account process 208 may be executed in distinct execution phases in one or more manners. For example, as a first execution phase, the validate account process 208 may initially receive personal identification number (PIN) information from a customer. The various processing actions in receiving the PIN information from the customer can include, for example, displaying a prompt on the ATM display and running a routine to verify data entry of the PIN information. In a next execution phase, the process 208 may establish a connection to the database 210 and use the PIN information as a key to identify the customer's record. Once the process 208 has completed its transaction with the customer's record, the connection to the database 210 may be terminated. In a final execution phase, the process 208 may generate results based on the foregoing transactions. As such, each of these execution phases include distinct logical endpoints (or processing breakpoint) at which the validate account process 208 may be temporarily suspended and/or resumed.

In some situations, one or more events may occur that tend to affect the course of normal system operation. Such events may be exceptions or errors raised by either hardware or software modules included in the processing system. For example, hardware exceptions or errors may include resets, interrupts or other signals from one or more hardware units. Exceptions may also be generated by an arithmetic logic unit for numerical errors such as divide by zero, overflow, instruction decoding errors, undefined instructions, etc. In some situations, devices connected to a network may fail or go temporarily offline thus causing other devices on the network to fail. Based upon the occurrence of one or more such events, it may be necessary to temporarily halt operations of one or more of the databases for taking corrective action (e.g., maintenance, switching-over to secondary system, etc.).

Other events that may call for halting of operations and corrective action may include detecting the failure of one or more of the databases 210-224. Such failures can occur for a variety of reasons. For example, there may be an error in memory allocation or a conflict in writing to a memory space. There may also be an error in an underlying data operation such as when a process attempts to withdraw funds from a depleted account. In addition to events where there are temporary failures, there may also be events that are triggered by operator intervention. In some implementations, the operator may correct the situation that caused the failure or the system may, in time, correct the situation. Examples of events can include, without limitation, a failure of one or more devices connected to a network, a shut down of one or more devices or software services for maintenance, a failure and switch over of a device or software service, an exhaustion of resources such as storage space, an overload of processing units, a time-out of one or more software services.

To detect and address such events, data processing systems may use one or more techniques often referred to as checkpointing techniques to ensure minimum system downtime in the event of a failure or when the system is taken offline for maintenance or switch-over. A checkpointing technique generally involves storing details of a current state of a process as a checkpoint record such that the process may use the stored information to be later restarted from that state. For example, the validate account process 204 may save its current state in a checkpoint record upon the completion of each execution phases (prior to starting execution of the next execution phase or other processing).

A checkpoint record may include various types of information such as process values, information about successfully processed records and other details relevant to the current execution phase of the process. For example, a checkpoint record can include information about a current position in a data queue (e.g., data queue 112 of FIG. 1) from which data is being processed. As such, after halting operations, processing may be resumed from this queue position. Along these lines, after recovery from a system failure, the process is able to restart from the stored intermediate checkpoint state rather restart from an initial state.

As an example, if the PIN database 210 fails, the validate account process 208 may raise an exception to cause the entire processing system to terminate. Upon restart, the processes (or a portion of the processes) in the processing system may continue processing from their last checkpoint states. In this example, since the failure and restart occurs at a point in time after the customer provided his PIN information, the PIN information is restored to the process and does not need to be recollected from the customer. As such, there may be no need to once again prompt the customer to provide his PIN information.

In the event of a system failure, terminating and restarting a processing system from the most recently complete checkpoint can consume an undue amount of processing time and resources. After a processing system has terminated its activity in response to the exception condition, the processing system may need to be manually reinitialized by an information technology specialist experienced with such systems. This can result in significant system downtime. In some examples, a separate process may need to be designed to detect the system failure and inform a specialist. Examples of checkpointing systems are described in U.S. Pat. No. 6,584,581 entitled "Continuous Flow Checkpointing Data Processing", U.S. Pat. No. 5,819,021, entitled "Overpartitioning system and method for increasing checkpoints in component-based parallel applications," and U.S. Pat. No. 5,712,971, entitled "Methods and Systems for Reconstructing the State of a Computation", of which the contents of each are incorporated herein in their entirety.

To improve efficiency and reduce processing resource consumption, processes are executed from their last recorded checkpoints instead of restarting the entire system upon restoration of a failed connection. In one implementation, rather than terminating and restarting the entire system, the individual processes in the system may be informed to abort processing until the failed connection is restored.

Figure 3:
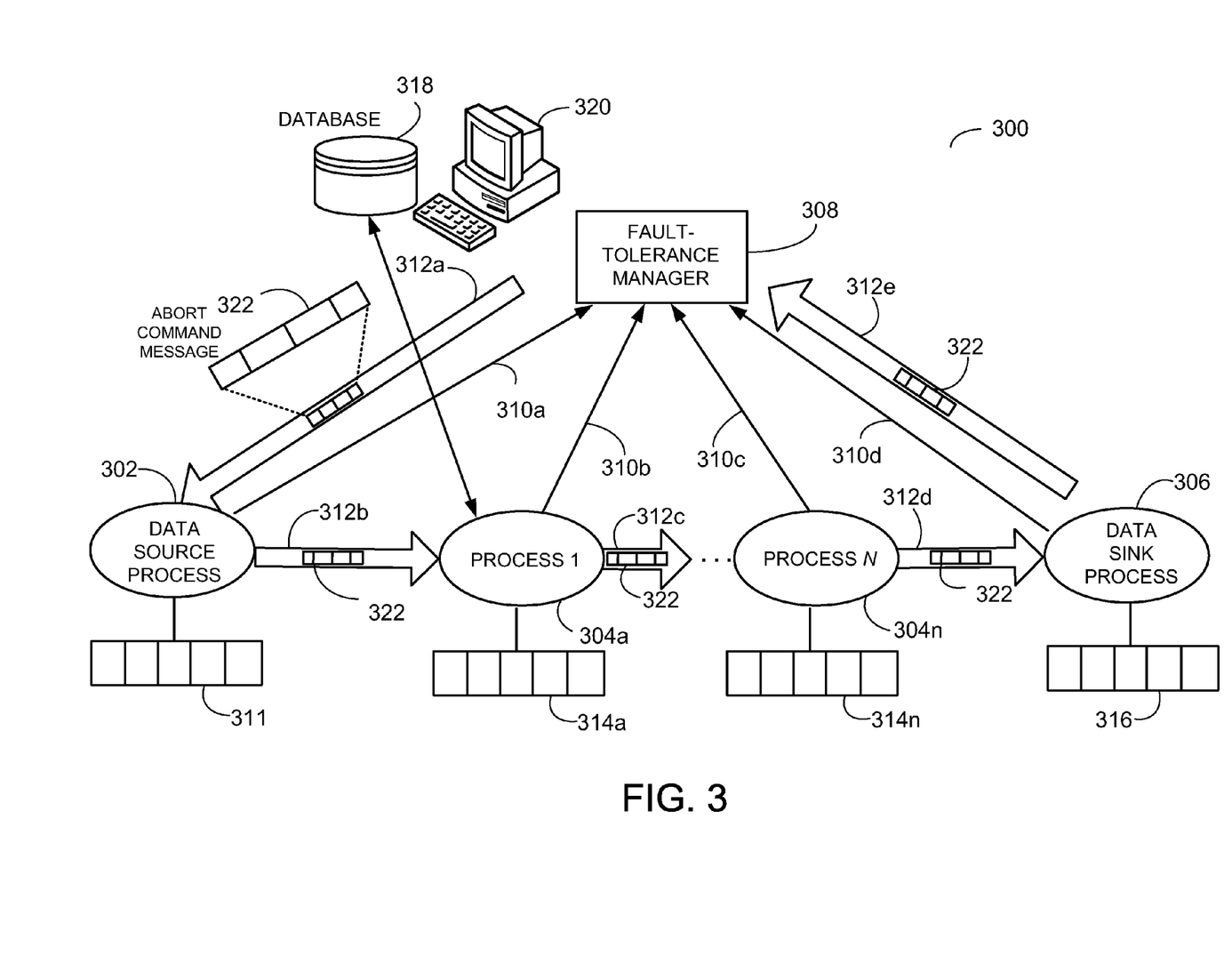

FIG. 3 shows a block diagram of a multi process system 300 that includes a data source process 302, processes 304a-n, a data sink process 306, and a fault-tolerance manager 308, which is in communication with each of the other processes (processes 302, 204a-n). In some implementations, the fault-tolerance manager 308 may be executed as another process within the multi process system 300. In some situations, the fault-tolerance manager 302 may be an application running on a separate computer system (not shown) or implemented in a dedicated processor, such as the checkpoint processor described in, for example, U.S. Pat. No. 6,584,581 entitled "Continuous Flow Checkpointing Data Processing", the contents of which are incorporated herein in their entirety.

One or more techniques may be implemented to establish communication among the processes 302-306 and the fault-tolerance manager 308. For example, individual exception channels 310a-n may be used for communicating information about exception conditions that may occur in the processes 302-306. The channels 310a-n can be part of a wired, wireless or combination wired and wireless network system. The channels 310a-n may be used by the processes 302-306 to communicate error information about the processes 302-306 to the fault-tolerance manager 308. For example, if an external device in communication with the process 304a should fail, the process 304a can immediately raise an error flag and communicate the error to the fault-tolerance manager 308 over the exception channel 310b.

In addition to exception channels 310a-n, the fault-tolerance manager 308 may send command messages (e.g., abort/suspension command messages and checkpoint command messages) to the processes 302-306 through the corresponding communication channels 312a-e. The communication channels 312a-e are arranged to transmit the command messages from the fault-tolerance manager 308 sequentially to each of the processes 302-306. For example, a message from the fault-tolerance manager 308 may be first communicated to the data source process 302 and then serially passed through each of the processes 304a-n and the data sink process 306 through the channels 312b-d. The data sink process 306 may use the channel 312e to communicate the command messages to the fault-tolerance manager 308.

The process 304a may be in further communication with an external database 318 (executed on computer system 320). Sometimes, the connection to the database 318 may fail or the database 318 may be taken offline for maintenance. The failure could be a hardware failure of the computer system 320 executing the database 318. In such situations, the process 304a may raise an error flag over the exception channel 310a to notify the fault-tolerance manager 308 of a loss of connection.

Upon receiving notification of the error, the fault-tolerance manager 308 may generate and propagate an abort command message 322 through the processes 302-306. In some implementations, the abort command message 322 informs each of the processes 302-306 to suspend operation and abort any work in progress. The abort command message 322 may be a special message packet that causes the processes to abort their current processing.

The abort message is typically first communicated to the data source process 302 by the channel 312a, then through each of the processes 302-306 by channels 312b-d, and finally back to the fault-tolerance manager 308 by channel 312e. Upon receiving the abort message 322, each of the processes 302-306 aborts its current activity with a relatively small delay (if any) and flushes/discards any outstanding tasks or records that may have been processed since the last checkpoint state. After a process has aborted its activity, it may pass the abort message 322 to the next downstream process. In this manner, the abort message 322 propagates through to the sink process 306 before being returned to the fault-tolerance manager 308. The fault-tolerance manager 308 waits until it receives the abort message 322 from the sink process 306, which establishes that all of the processes 302-306 have aborted current processing tasks (e.g., are in a quiescent state).

In the scenario in which the database 318 has failed due to a hardware failure in the computer system 320, the processes 302-306 are directed to abort their processing. In some implementations, after the system has fully aborted its processing, the process 302 may wait for a specifiable amount of time, a time that should reflect an average amount of time that it takes to correct the failure, and once again begin processing from the last saved checkpoint state. In some implementations, the process 304a may periodically poll the database 318 to check for its status (i.e., to check whether the database 318 is operational). In some examples, the computer system 320 may be configured to automatically notify the process 304a when the database 318 is restored to operational state. When the connection with the database 318 is restored, the processing system 300 may once again begin processing from the last saved checkpoint state.

In this regard, the process 304a notifies the fault-tolerance manager 308 that the connection has been restored. The fault-tolerance manager 308 determines the last successfully completed checkpoint state for each of the processes 302-306, and sends a resume processing message (not shown) to each of the processes 302-306. As with the other command messages, the resume processing message is propagated over the communication channels 312a-e sequentially through each of the processes 302-306.

In implementations, the resume processing message specifies a checkpoint state from which the processes 302-306 are to resume processing. Checkpointing involves storing multiple checkpoint states to respective storage areas. To store checkpoint state data associated with each of the processes 302, 304a-n, 306, storage areas (e.g., memories) may be assigned to each process. Each process periodically suspends its current operation at the end of a distinct execution phase and stores its checkpoint data in the associated storage area. For example, the data source process 302 may periodically suspend its current operation at the end of distinct execution phases in processing (such as logical breakpoints in the stream of incoming data) and stores checkpoint information in the storage area 311. In this manner, as each of the processes 302, 304-a-n, 306 are executed, corresponding storage areas 311, 314a-n, and 316 periodically save checkpoint data. The checkpoint data may include information about current states and/or data associated with the processes 302-306 to allow for reconstruction of those states at a later time. The storage areas 311-316 may be implemented with various type of storage techniques such as on non-volatile storage, e.g., magnetic media, such as a hard disk drive.

The fault-tolerance manager 308 manages the checkpointing operation by generating and sequentially passing checkpoint command messages (not shown) through the communication channels 312a-e to each process 302-306. Description about the checkpoint command messaging system is provided in greater detail in co-pending U.S. patent application Ser. No. 13/030,998, filed on Feb. 18, 2011, the contents of which are incorporated herein by reference in their entirety. The checkpoint command messages pass through each process 302-306 so that the process may checkpoint its current state upon receiving the message. As such, the checkpoint command message travels to the data source process 302 and then sequentially passes through each process 304a-n and data sink process 306 before being returned to the fault-tolerance manager 308. This checkpointing operation may be automatically initiated at regular intervals. For example, the fault-tolerance manager 308 may initiate checkpoint command messages at a predetermined periodic rate, e.g., every five minutes. The periodic rate may be set to a default value, or adjusted by a user. In some examples, one or more external triggers may initiate operations for storing checkpoint information. In one instance, a network message may inform the fault-tolerant manager 308 of an impending network shutdown and thus trigger a checkpointing operation. In some implementations, the checkpointing operation may be triggered in response to values within or derived from the data records being processed. For example, the processed data records may include timestamps or breakpoint values that can be considered as logical points at which checkpointing may occur.

Along with storing checkpoint information during periods in which data is being processed by the system, information may be stored prior to processing data. In one implementation, an initial checkpointing operation may be triggered upon the multi-process system 300 being first initialized, e.g., during start-up. The fault-tolerance manager 308 may pass a initial checkpoint command message through each of the processes 302-306. In the example shown in FIG. 3, the initial checkpoint message is first communicated to the data source process 302. The data source process 302 immediately checkpoints, e.g., stores data that represents its initial state to the associated data storage space 311 and passes the initial checkpoint message downstream to the next process 304a. This initial checkpoint state is referred to as checkpoint state zero. Similarly, in a serial manner, each of the processes 304-306 may correspondingly stores its initial state and associated data values to the appropriate storage area as checkpoint state zero. In examples, the initial state and associated data values can include initial values of global variables, reference data information, and auditing variables including initial values of counters.

After each of the processes 302-306 have stored their initial states, the initial checkpoint command message is returned to the fault-tolerance manager 308 through the channel 312e. Based upon the message being returned to the fault-tolerance manager 308 after its round trip through the processes 302, 304a-n, 306, the fault-tolerance manager is alerted that the processes 302-306 have completed checkpoint state zero. In some implementations, while the downstream processes are saving their current states, the source and other upstream processes may continue to receive data and perform other functions without waiting for all processes to save their states.

Similarly, additional checkpointing may be performed for each distinct execution phase of the processes 302-306. As such, along with storing data that represents the initial checkpoint information, the fault-tolerance manager 308 may initiate the storage of additional information, for example, which represents information associated with subsequent checkpoint cycles (e.g., checkpoint states 1, 2, 3, . . . n). To initiate storage of subsequent checkpoint information, techniques such as propagating further checkpoint command messages through the processes 302, 304a-n, 306 may be utilized. Upon receipt of a checkpoint command message, the process 304a may either complete any ongoing tasks or suspend any outstanding tasks. In some examples, the process 304a may delete previously created checkpoint records stored in the data storage 314 and reclaim the storage space. The process 304 can then create a new checkpoint record for its current state and associated data. In some scenarios, earlier checkpoint records are persistently stored in memory and not overwritten by new checkpoint records. Further examples of information stored in checkpointing records are provided in U.S. Pat. No. 6,584,581, the contents of which are incorporated herein in its entirety.

In some instants, the fault-tolerance manager 308 may initiate additional checkpointing operations while prior checkpointing operations are currently being executed. For example, while process 304n is processing an arbitrary checkpoint state (e.g., checkpoint state N corresponding to checkpoint command message N), the fault-tolerance manager 308 may begin a subsequent checkpoint state (e.g., checkpoint state N+1) by generating and transmitting a subsequent checkpoint command message N+1 to the source process 302. Along these lines, it is possible that as checkpoint command message N is still traveling through the processes 302-306, a new subsequent checkpoint command message N+1 is generated and passed through the processes 302-306. In this manner, the fault-tolerance manager 308 can cause more frequent checkpointing of process states without having to wait until previous checkpointing states are completed.

In some situations, it is possible that a system failure may occur while one or more checkpoint command messages are in transit through the processes 302, 304a-n, 306. For example, consider a scenario in which the fault-tolerance manager 308 has initiated checkpoint state N by generating checkpoint command message N. While the checkpoint command message N is being processed by the processes 302-306, the connection between one of the processes (e.g., process 304a) and an external system (e.g., database 312) may fail. Upon being alerted to the situation, the fault-tolerance manager 308 may respond by passing an abort command message 322 through the processes 302-306. The abort command message 322 may reach a process (e.g., process 304n) that is still processing checkpoint state N (e.g., storing checkpoint information associated with the checkpoint N). Based upon receipt of the abort command, the process 304n may take one or more actions. For example, the process 304n may complete checkpoint state N and abort all further processing. In another scenario, the process 304n may discard results associated with the current and subsequent states since a previous checkpoint state N−1 and abort further processing. As a result, when the system 300 achieves quiescence, each of the processes 302-306 may be at different checkpoint states. For example, all processes that are upstream from process 304n (e.g., the data sink process 306) may have completed checkpoint state N, while all processes downstream (e.g., process 304a and the data source process 302) from process 304n may have completed only checkpoint state N−1.

When the system 300 is ready to resume processing, the fault-tolerance manager 308 transmits one or more resume processing messages to each process over the communication channels 312a-e. The resume processing message indicates to the processes the earliest, fully committed (or completed) checkpointed state (e.g., checkpoint state N−1) from which they are to execute. In examples, processes that may have already completed checkpoint state N may simply reproduce the results from checkpoint state N−1 to checkpoint state N. In this manner, the processes 302-306 may avoid duplicating their earlier efforts. In examples, replaying the results from checkpoint state N−1 to checkpoint state N involves reproducing the results of the earlier processing actions that may have occurred between the two checkpoint states.

In examples, a system failure can occur substantially immediately after start-up. In such situations, many of the processes 302-306 may have only completed checkpoint state zero. These processes 302-306 can resume processing from checkpoint state zero based on initialization data and start-up values stored in the corresponding checkpoint records.

Figure 4:
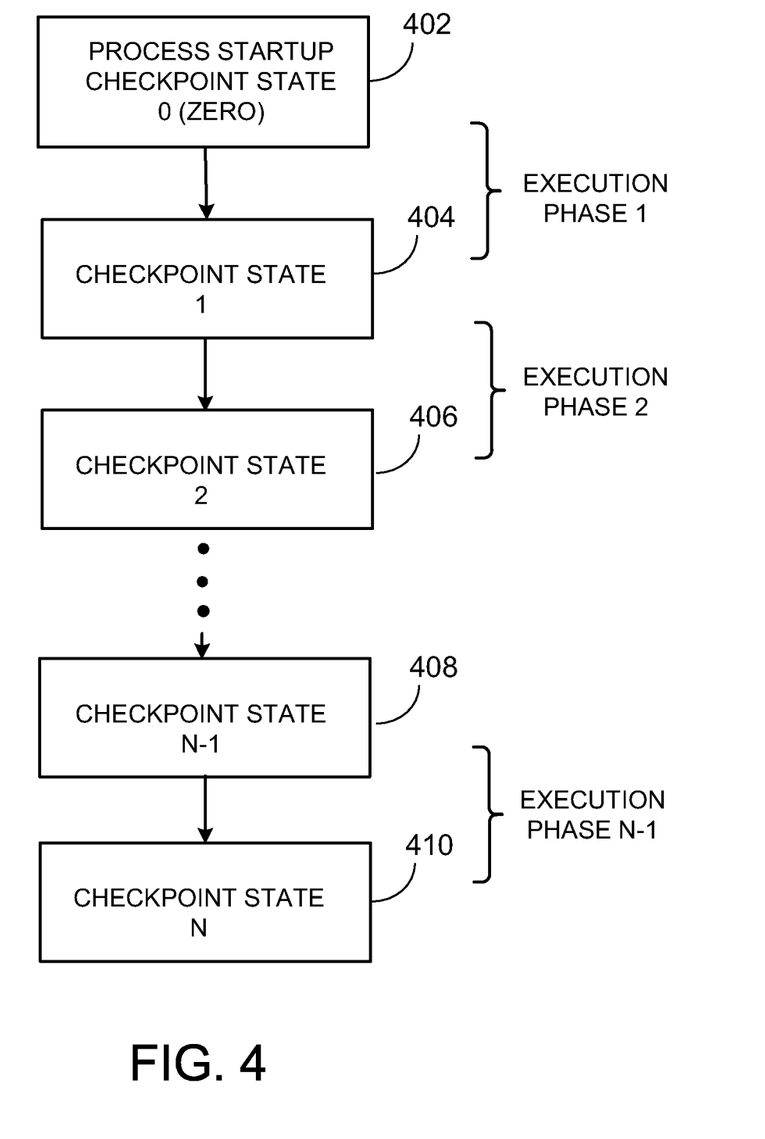
FIG. 4 is flowchart illustrating an exemplary checkpointing process.

FIG. 4 is a flowchart depicting exemplary execution of a process (e.g., process 302 of FIG. 3) within a multi-process system. At start-up, the process immediately stores its initial state to data storage as checkpoint state zero (Step 402). The process may then be executed in distinct execution phases (e.g., execution phase 1, 2, . . . N−1). At the conclusion of each execution phase, the process may save its end state to data storage as a checkpoint state. For example, after a first execution phase, the process may save the end state of the first execution phase as checkpoint state 1 (Step 404). Similarly, after subsequent execution phases, the process may save the end states of the execution phases as checkpoint states 2, . . . N−1, and N (Steps 406-410).

Figure 5:
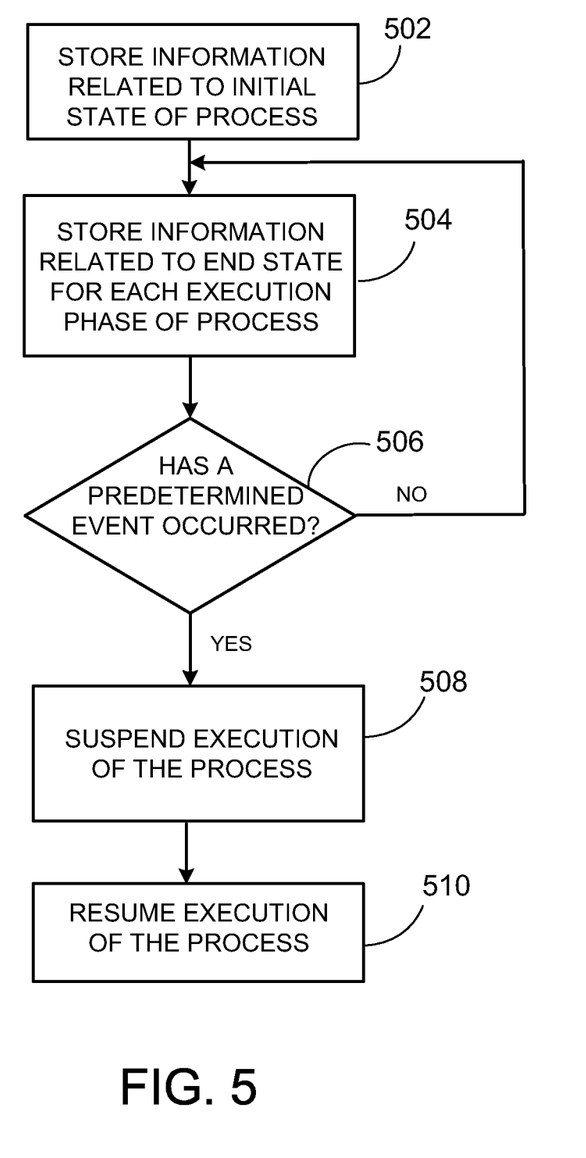
FIGS. 5 and 6 are flowcharts of exemplary recovery mechanisms.

FIG. 5 is a flowchart depicting example steps executed in storing and resuming from checkpoints while executing a process. For example, upon initializing the process, information relating to an initial state of the process is stored in an associated storage area (Step 502). The process is then executed in distinct execution phases. As such, at the end of each execution phase, the process stores information representative of an end state of the execution phase (Step 504). When a predetermined event occurs, e.g., loss of connection to an external device (Step 508), execution of the process is aborted (Step 506). In the meantime, the process checks to see if the event that triggered the suspension has cleared (e.g., restoration of connection to the external device). During this time, the process is not shut down, but processing is aborted until the event is deemed cleared. Execution of the process is resumed from the last saved initial or end state (Step 510).

Figure 6:
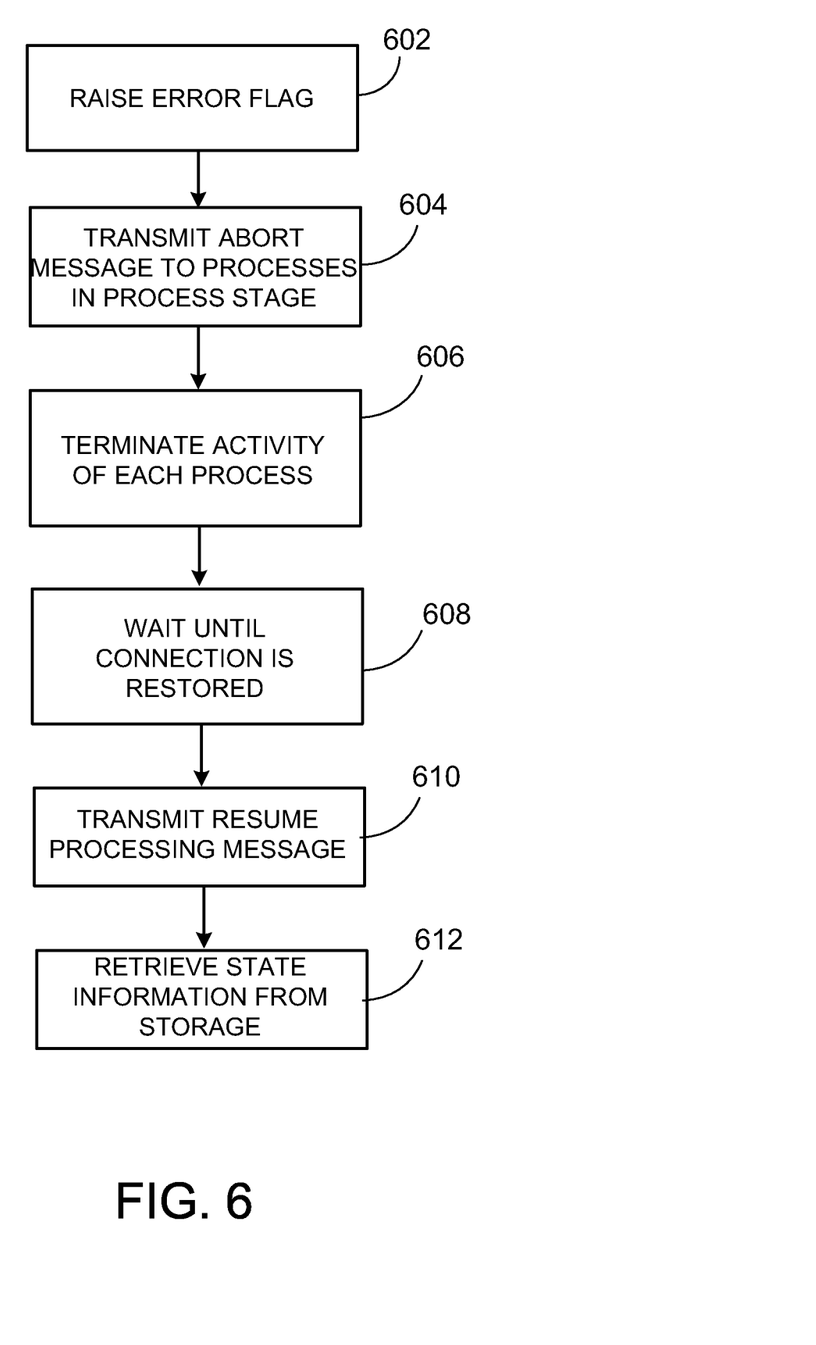

FIG. 6 is a flowchart depicting example steps executed in the event an external system fails or is taken offline for maintenance. For example, the external system may be a database (e.g., database 312 of FIG. 3) in communication with a process in a processing system. When the external system is taken offline for maintenance, or fails, an error flag may be raised by, for example, a process in communication with the failed external system (Step 602). An abort message (e.g., abort command message 322 of FIG. 3) may be generated and transmitted through the processes in response to the error flag (Step 604). The current activity of each of the processes is aborted when the process receives the abort command message (Step 606). Also, any transactions performed since the last checkpoint state may be discarded by the processes. Further action is aborted until the failed connection to the external system is restored (Step 608). When the connection is restored, a resume processing message is transmitted to each of the processes (Step 610). The resume processing message indicates the checkpoint state from where the processes are to resume processing. As such, each of the processes retrieves the relevant information regarding the checkpoint state from their associated storage areas (Step 612).

The restarting of processes described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of dataflow graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

The invention claimed is:

1. A computer-implemented method, including:
    transmitting a message in response to a predetermined event through at least first and second processes configured to execute one or more tasks, the message instructing the abortion of the executing of the one or more tasks, in which the first process is configured to provide data to the second process;
    receiving the message during a first execution phase of the first process after initialization of the first process and before completion of the first execution phase,
    initiating abortion of executing of the one or more tasks by the one or more of the processes on receiving the message; and
    resuming execution of the first process from a saved initial state without needing to shut down and restart the first process.

2. The computer-implemented method of claim 1, including:
    storing information related to initial states of each of the first and second processes upon being initialized.

3. The computer-implemented method of claim 1, wherein execution of a process includes executing at least one execution phase of the process and storing information representative of an end state of the execution phase upon completion of the corresponding execution phase.

4. The computer-implemented method of claim 3, including:
    resuming execution of one or more of the first and second processes from one of the saved end states without needing to shut down the processes.

5. The computer-implemented method of claim 1 wherein the predetermined event represents a loss of connection to an external device.

6. The computer-implemented method of claim 1 wherein the predetermined event represents an error with an external device.

7. The computer-implemented method of claim 5 wherein process execution is resumed when the connection to the external device has been restored.

8. The computer-implemented method of claim 6 wherein the execution of the process is resumed when the error with the external device has been cleared.

9. The computer-implemented method of claim 3 wherein process execution is resumed from an end state that is stored prior to an execution phase in which the predetermined event occurred.

10. The computer-implemented method of claim 2 wherein execution of one or more of the first and second processes is resumed from the initial states if the predetermined event occurs after startup of the processes and before completion of an execution phase.

11. The computer-implemented method of claim 1 wherein process execution includes performing one or more processing actions on a received stream of data to produce output data.

12. The computer-implemented method of claim 1, including:
    transmitting a checkpoint message through the first and second processes of the process stage, the checkpoint message including instructions for storing current information about the processes, and
    aborting operation upon receiving the checkpoint message at the process and initiating storage of information related to a current execution state of the process to a storage area.

13. The computer-implemented method of claim 12, including:
    overwriting a previously stored initial or end state with the new initial or end state.

14. The computer-implemented method of claim 1, wherein each of the first and second processes is in communication with one or more data queues for receiving and queuing data for the processes.

15. The computer-implemented method of claim 12, further including:
    generating the checkpoint message in response to a network-related event.

16. The computer-implemented method of claim 15 wherein the network-related event represents a network shutdown.

17. The computer-implemented method of claim 12, further including:
    periodically generating the checkpoint message.

18. The computer-implemented method of claim 12, further including:
producing the checkpoint message in response to one or more data values within or derived from incoming data records to be processed by the processes.

19. The computer-implemented method of claim 2 further including:
resuming execution of one or more of the first and second processes from one of the saved end states based in part on information contained in a resume processing message.

20. A non-transitory computer-readable storage medium storing a computer program including instructions for causing a computing system to:
transmit a message in response to a predetermined event through at least first and second processes executing one or more tasks, the message instructing the abortion of the one or more tasks being executed, in which the first process is configured to provide data to the second process;
receive the message during a first execution phase of the first process after initialization of the first process and before completion of the first execution phase,
initiate abortion of execution of the one or more tasks by the one or more of the processes on receiving the message, and
resume execution of the first process from a saved initial state without needing to shut down and restart the first process.

21. A computing system, including:
a device or port configured to transmit a message in response to a predetermined event through at least first and second processes executing one or more tasks, the message instructing the abortion of the one or more tasks being executed, in which the first process is configured to provide data to the second process; and
at least one processor configured to
receive the message during a first execution phase of the first process after initialization of the first process and before completion of the first execution phase,
initiate abortion of execution of the one or more tasks by the one or more of the processes on receiving the message, and
resume execution of the first process from a saved initial state without needing to shut down and restart the first process.

22. A computing system, including:
means for transmitting a message in response to a predetermined event through at least first and second processes executing one or more tasks, the message instructing the abortion of the one or more tasks being executed, in which the first process is configured to provide data to the second process;
means for receiving the message during a first execution phase of the first process after initialization of the first process and before completion of the first execution phase;
means for initiating abortion of execution of the one or more tasks by the one or more of the processes on receiving the message; and
means for resuming execution of the first process from a saved initial state without needing to shut down and restart the first process.

23. A computer-implemented method, including:
transmitting, from a manager executing on a computer system, an abort command message in response to a predetermined event;
receiving, at a first process configured to execute one or more tasks, an abort command message;
aborting execution of the one or more tasks of the first process;
transmitting an abort command message from the first process to a second process configured to execute one or more tasks;
aborting execution of the one or more tasks of the second process;
transmitting a returned abort command message to the manager;
determining that the predetermined event has cleared, and resuming execution of the first and second processes without the need to restart the first and second processes.

24. The method of claim 23 in which the first process is configured to provide data to the second process, and the second process is configured to process the data to complete the one or more tasks.

25. The method of claim 23, comprising transmitting an abort command message from the second process to a sequence of downstream processes, in which the returned abort command message is transmitted from the last one of the downstream processes to the manager.

26. The method of claim 23, comprising, after the manager receives the returned abort command message, transmitting from the manager a resume processing message, and receiving at the first process the resume processing message.

27. A computing system, including:
one or more processors executing instructions to implement
a manager configured to transmit an abort command message in response to a predetermined event; and
a series of processes configured to execute one or more tasks;
wherein a first process in the series of processes is configured to, upon receiving an abort command message, abort execution of one or more tasks of the first process, and transmit an abort command message to a second process in the series of processes, the second process being downstream of the first process;
wherein the second process is configured to, upon receiving an abort command message, abort execution of one or more tasks of the second process;
wherein a last process in the series of processes is configured to transmit a returned abort command message to the manager;
wherein upon determining that the predetermined event has cleared, execution of the first and second processes are resumed without the need to restart the first and second processes.

28. The system of claim 27 in which the first process is configured to provide data to the second process, and the second process is configured to process the data to complete the one or more tasks.

29. The system of claim 27, wherein the manager is configured to, after receiving the returned abort command message, transmit a resume processing message to the series of processes.

30. The non-transitory computer-readable storage medium of claim 20, in which the computer program includes instructions for causing the computing system to store information related to initial states of each of the first and second processes upon being initialized.

31. The non-transitory computer-readable storage medium of claim 20, in which execution of a process includes executing at least one execution phase of the process and storing information representative of an end state of the execution phase upon completion of the corresponding execution phase.

32. The non-transitory computer-readable storage medium of claim 20, in which the predetermined event represents at least one of a loss of connection to an external device or an error with an external device.

33. The non-transitory computer-readable storage medium of claim 20, in which process execution is resumed from an end state that is stored prior to an execution phase in which the predetermined event occurred.

34. The non-transitory computer-readable storage medium of claim 20, in which the computer program includes instructions for causing the computing system to transmit a checkpoint message through the first and second processes, the checkpoint message including instructions for storing current information about the processes.

35. The non-transitory computer-readable storage medium of claim 20, in which each of the first and second processes is in communication with one or more data queues for receiving and queuing data for the processes.

36. The computing system of claim 21, in which the at least one processor is configured to store information related to initial states of each of the first and second processes upon being initialized.

37. The computing system of claim 21, in which execution of a process includes executing at least one execution phase of the process and storing information representative of an end state of the execution phase upon completion of the corresponding execution phase.

38. The computing system of claim 21, in which the predetermined event represents at least one of a loss of connection to an external device or an error with an external device.

39. The computing system of claim 21, in which process execution is resumed from an end state that is stored prior to an execution phase in which the predetermined event occurred.

40. The computing system of claim 21, in which the at least one processor is configured to transmit a checkpoint message through the first and second processes, the checkpoint message including instructions for storing current information about the processes.

41. The computing system of claim 21, in which each of the first and second processes is in communication with one or more data queues for receiving and queuing data for the processes.

42. The computing system of claim 22, comprising means for storing information related to initial states of each of the first and second processes upon being initialized.

43. The computing system of claim 22, in which the predetermined event represents at least one of a loss of connection to an external device or an error with an external device.

44. The method of claim 1 in which the second process is configured to process the data received from the first process by at least one of transforming, filtering, or confirming content of the data.

45. The non-transitory computer-readable storage medium of claim 20 in which the second process is configured to process the data received from the first process by at least one of transforming, filtering, or confirming content of the data.

46. The computing system of claim 21, in which the second process is configured to process the data received from the first process by at least one of transforming, filtering, or confirming content of the data.

47. The computing system of claim 22, in which the second process is configured to process the data received from the first process by at least one of transforming, filtering, or confirming content of the data.

\* \* \* \* \*